United States Patent [19]

Shimizu et al.

[11] 4,198,063
[45] Apr. 15, 1980

[54] SHAFT SEALING DEVICE FOR TURBOCHARGER

[75] Inventors: Masami Shimizu, Chiba; Takaaki Koike, Hachioji, both of Japan

[73] Assignee: Ishikawajima-Harima Jukogyo Kabushiki Kaisha, Tokyo, Japan

[21] Appl. No.: 924,693

[22] Filed: Jul. 14, 1978

[30] Foreign Application Priority Data

Oct. 6, 1977 [JP] Japan .................... 52-133708[U]

[51] Int. Cl.² ........................... F16J 15/40
[52] U.S. Cl. ..................... 277/79; 277/133; 277/170; 277/217; 415/110; 417/407
[58] Field of Search ............ 277/133, 134, 73–77, 277/27, 168, 170–172, 59, 71, 72 R, 79, 216, 217; 415/111, 112, 115, 110; 417/407

[56] References Cited

U.S. PATENT DOCUMENTS

| 1,724,902 | 8/1929 | Bentley | 277/133 X |
| 2,686,657 | 8/1954 | Kalitinsky | 277/71 X |
| 2,912,264 | 11/1959 | Peck | 277/171 X |
| 3,097,855 | 7/1963 | Allen | 277/170 X |
| 3,174,720 | 3/1965 | Sproule | 415/110 |
| 3,512,788 | 5/1970 | Kilbane | 415/110 X |
| 3,728,857 | 4/1973 | Nichols | 62/402 X |
| 3,961,867 | 6/1976 | Woollenweber | 415/110 X |

FOREIGN PATENT DOCUMENTS

| 2437530 | 2/1976 | Fed. Rep. of Germany | 417/407 |
| 739911 | 11/1932 | France | 277/133 |
| 552296 | 3/1943 | United Kingdom | 277/170 |
| 770430 | 3/1957 | United Kingdom | 417/407 |

Primary Examiner—Robert S. Ward, Jr.
Attorney, Agent, or Firm—Scrivener, Parker, Scrivener and Clarke

[57] ABSTRACT

A shaft sealing device for turbocharger wherein the outer peripheral surface of a piston or shaft sealing ring and its mating surface of the shaft bore of a bearing casing are axially tapered or diverted at the same positive angle toward the high pressure side, whereby wear of the ring may be avoided and the leakage of gases from the turbine into the bearing casing and the leakage of oil from the bearing casing to the turbine may be prevented.

1 Claim, 7 Drawing Figures

SHAFT SEALING DEVICE FOR TURBOCHARGER

DETAILED DESCRIPTION OF THE INVENTION

The prior art shaft sealing arrangements with piston rings on the side of a turbine of a small-sized turbocharger may be in general divided into three types as shown in FIGS. 1, 2 and 3, respectively. In the shaft sealing device as shown in FIG. 1, a piston ring a may freely axially displace itself along the surface of a shaft bore in a bearing wheel chamber or casing b. In the sealing device shown in FIG. 2, the shaft bore is stepped adjacent to the lower pressure end thereof in order to prevent the axial displacement of the piston ring a toward the low pressure side. In the sealing device or arrangement of the type shown in FIG. 3, the piston ring a is securely fitted into a circumferential groove formed in the surface of the shaft bore so as to prevent the displacement of the piston or seal ring a in both axial directions or to either the high or low pressure side.

The sealing device or arrangement shown in FIG. 1 has a defect that because of the free displacement of the piston or seal ring a in both axial directions under the gas pressure, the piston ring a rapidly wears away. The sealing device or arrangement of the type shown in FIG. 2 is advantageous in that the displacement to the low pressure side of the piston or seal ring a may be prevented but is disadvantageous in that it is difficult to machine the step in the shaft bore with sufficient dimensional tolerances and that carbon tends to accumulate at the corner of the stepped portion so that the edge on the high pressure side of the piston ring rapidly wears away. The sealing device of the type shown in FIG. 3 may avoid the defects encountered in both the sealing devices shown in FIGS. 1 and 2, but is disadvantageous in that machining as well as assembly are difficult. In summary, all of the above three sealing devices have common problems that wear and maladjustment of a clearance of the piston or seal ring a cause the increase in amount of blow-by gas and the leakage to exterior of oil and that the accumulation of carbon prevents the smooth rotation of a shaft.

The present invention was made to overcome the above and other related problems encountered in the prior art shaft sealing devices and will become apparent from the following description of one preferred embodiment thereof taken in conjunction with the accompanying drawings, in which.

Figure 4:
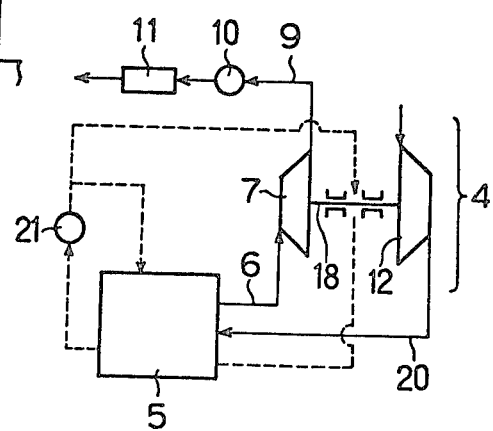
FIG. 4 is a diagrammatic view of a turbocharger for an automotive engine incorporating a shaft sealing device in accordance with the present invention.
Figure 5:
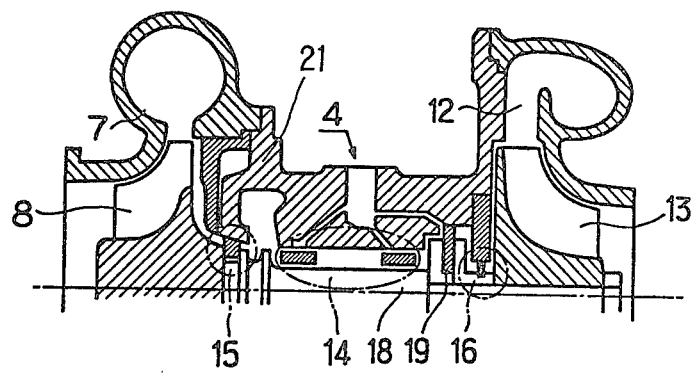
FIG. 5 is a fragmentary sectional view of the turbocharger shown in FIG. 4.

Referring first to FIGS. 4 and 5, in a turbocharger driven by a turbine powered with exhaust gases from an engine 5, exhaust gases 6 from the internal combustion engine 5 flows into a turbine casing 7, rotates a turbine wheel 8 and flows out into the surrounding atmosphere through an exhaust pipe 9 communicated with an exhaust brake 10 and a muffler 11. A blower impeller 13 which is mounted on a common shaft 18 together with the turbine wheel 8 compresses the air in a blower casing 12 and supplies the compressed air through an intake pipe 20 into the internal combustion engine 5 in order to increase the air charge weight and the output from the engine 5.

The turbocharger 4 further includes a bearing 14, a turbine-side seal 15 and a blower-side seal 16, and in case of a small-sized turbocharger an oil pump 21 effects the forced lubrication of the bearing 14. The leakage of lubricating oil into the turbine and blower as well as the leakage of the compressed air and exhaust gases into the bearing housing are prevented by the turbine-side and blower-side seals 15 and 16.

Figure 6:
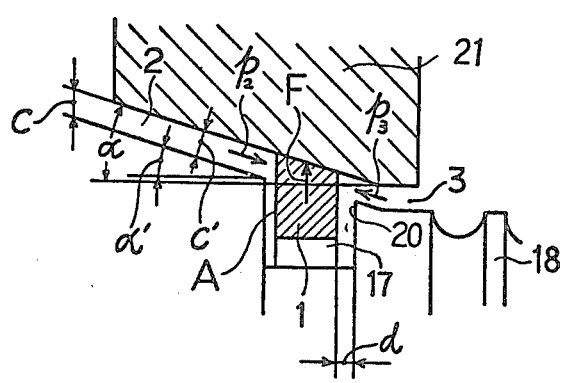
FIG. 6 is a fragmentary sectional view, on enlarged scale, thereof illustrating a sealing arrangement on the side of a turbine.

FIG. 6 is a fragmentary view, on enlarged scale, of the turbine-side seal 15. The interface between the piston ring 1 and the bearing casing 21 is tapered or diverted axially outwardly at an angle $\alpha$ from the bearing side (low pressure side) 3 to the turbine side (high pressure side) 2.

In general, in almost all of the turbochargers for automobiles the exhaust gases are discharged through the exhaust pipe 9 into the exhaust brake 10 (See FIG. 4), the pressure $p_2$ on the turbine side 2 is a relatively high pressure of the order of 2 to 3 kg/cm², but the pressure $p_3$ in the bearing casing or low pressure side 3 is by far smaller than the pressure $p_2$. As a consequence, the exhaust gases leak from the turbine or high pressure side 2 to the bearing or low pressure side 3 so that the piston or seal ring 1 is forced to be displaced toward the bearing or low pressure side 3. However, with the piston ring 1 in accordance with the present invention, as it is forced to be displaced toward the bearing or low pressure side 3, the outer diameter of the ring 1 is forced to shrink so that the tensions F of the ring 1 are increased. In this specification the term "the (radial) tensions F" is defined as the forces required for the compressed ring 1 to restore its original shape with a nominal outer diameter. Therefore the free displacement of the seal ring 1 is prevented and is held stationary at the pressure equilibrium or under the condition of $p_2 A = \mu F$, where A is the pressure receiving or bearing area of the ring 1; and $\mu$ is the coefficient of sliding friction between the ring 1 and the surface of the shaft bore of the bearing casing 21.

Figure 7:
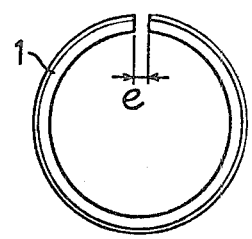
FIG. 7 is a top view of a piston ring.

As shown in FIG. 7, the piston or seal ring 1 in accordance with the present invention is radially split with a clearance or gap e between the ends in order to facilitate the insertion of the ring 1 into a circumferential groove 17 in the turbine shaft 18 and to attain required tensions. As the ring 1 is forced to displace itself toward the bearing or low pressure side 3, the clearance or gap e is decreased and finally the ends of the split ring 1 are forced to press against each other with no clearance or gap therebetween. In this case, no further displacement of the ring 1 toward the bearing or low pressure side 3 is permitted any longer. A clearance d is left between the ring 1 and the radial wall 20 of the circumferential groove 17 when the displacement of the ring 1 is prevented so that the contact between the piston ring 1 and the shaft 18 may be avoided and consequently wear of the ring 1 will not occur. Even when the tensions F of the ring 1 are reduced due to the aging of the ring, wear of the ring 1 may be minimized or may be by far less as compared with the prior art.

As shown in FIG. 5, a thrust metal 19 is provided so as to prevent the axial movement of the shaft 18, but a slight axial movement cannot be avoided because of the design. When the shaft 18 is displaced toward the turbine or high pressure side 2, the radial wall 20 of the circumferential ring groove 17 is also displaced toward the ring 1 and is made into contact with it. However the outer peripheral surface of the ring 1 is tapered as described above, the axial component exists so that the ring 1 may be easily displaced. Furthermore as the ring 1 is displaced toward the turbine or high pressure side 2 the outer diameter of the ring 1 is increased so that the tensions F are reduced and consequently the displacement toward the turbine or high pressure side 2 of the ring 1 may be further facilitated. Therefore the wear of the ring 1 due to the contact with the radial wall 20 of the circumferential groove 17, which has been the inherent problem of the prior art shaft sealing devices, may be minimized or substantially eliminated. Furthermore the clearance d may be reduced to a minimum or may be substantially eliminated.

The radial clearance c between the surface of the shaft bore of the bearing casing 21 and the turbine shaft 18 is dependent upon a bearing clearance. Since the clearance c' is cos α times as much as the clearance c, the blow-by gas may be reduced.

So far the present invention has been described as being applied to the shaft sealing between the turbine and bearing casings of the turbocharger, but it may be understood that the present invention may be equally applied to the sealing between the bearing and blower casings when there exists a pressure difference between them.

Figure 1:
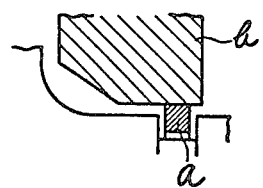
FIGS. 1, 2 and 3 are schematic sectional views of the prior art shaft sealing devices, respectively, for sealing a shaft of turbocharger on the side of a turbine.

In summary, in the piston ring type shaft sealing device for the turbocharger in accordance with the present invention, the interface between the piston ring and the surface of the shaft bore of the bearing casing 21 is tapered or diverted axially toward the high pressure side at an angle. As a result the present invention may attain the following effects or advantages:

(1) In general, the exhaust gases are discharged from the small-sized turbocharger through the exhaust pipe and the exhaust brake, the pressure acting on the turbine side surface of the piston ring is a few times as high as the pressure acting on the opposite surface of the ring. Therefore in case of the shaft sealing device as shown in FIG. 1 where the free axial displacement of the ring is permitted, the ring wears away rapidly within a relatively short period so that the oil leakage results. However, according to the present invention the wear of the piston ring may be minimized so that the lifetime of the ring may be by far increased as compared with the prior art arrangements.

(2) Since the outer peripheral surface of the ring and the mating surface of the shaft bore of the bearing casing are tapered axially, the ring insertion portion (tapered portion) of the bearing casing in the prior art sealing arrangements may be eliminated or reduced to a minimum so that a limited space may be fully utilized.

Figure 2:
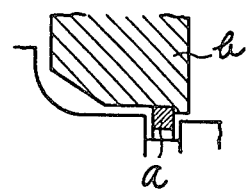
Figure 3:
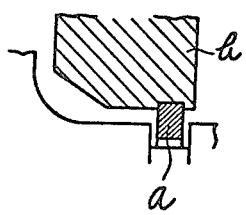

(3) Machining of parts may be much facilitated as compared with the prior art shaft sealing devices shown in FIGS. 2 and 3 where the axial displacement of the ring is partially or completely prevented. Furthermore the clearances between the ring and the radial walls of the circumferential ring groove of the turbine shaft may be minimized so that the sealing performance may be remarkably improved. Moreover the axial displacement of the ring may be permitted.

(4) As compared with the prior art shaft sealing devices the insertion of the piston ring and the assembly of the parts may be much facilitated. Furthermore the turbine shaft may be tapered adjacent to the root of the turbine wheel so that stresses may be reduced.

What is claimed is:

1. In a piston ring type shaft sealing device for a turbocharger, the improvement wherein the outer peripheral surface of a split piston ring and the mating surface of a shaft bore of a bearing casing are tapered at the same angle toward the high pressure side, said turbine shaft being axially tapered in such a way that said turbine shaft may be co-axially spaced apart from the wall surface of the shaft bore of said bearing casing by a predetermined clearance, the adjacent edges of said split ring adapted to gradually press together to finally abut as the ring is displaced toward the low pressure side to prevent further displacement of the ring toward the low pressure side.

* * * * *